(12) United States Patent
Liu

(10) Patent No.: US 7,249,975 B1
(45) Date of Patent: Jul. 31, 2007

(54) MICRO SD ADAPTER STRUCTURE

(75) Inventor: Shih-Tung Liu, Gongguan Township, Miaoli County (TW)

(73) Assignee: Sun-Light Electronic Technologies Inc. (TW)

( * ) Notice: Subject to any disclaimer, the term of this patent is extended or adjusted under 35 U.S.C. 154(b) by 0 days.

(21) Appl. No.: 11/463,604

(22) Filed: Aug. 10, 2006

(51) Int. Cl.
*H01R 24/00* (2006.01)

(52) U.S. Cl. ...................................... 439/630

(58) Field of Classification Search ............... 439/630, 439/188, 638; 361/684
See application file for complete search history.

(56) References Cited

U.S. PATENT DOCUMENTS

| | | | |
|---|---|---|---|
| 6,764,327 B2 * | 7/2004 | Yu | 439/188 |
| 6,832,931 B1 * | 12/2004 | Wu | 439/499 |
| 6,902,435 B1 * | 6/2005 | Cheng | 439/630 |
| 6,915,956 B2 * | 7/2005 | Liu et al. | 235/492 |
| 6,969,281 B2 * | 11/2005 | Lai | 439/630 |
| 7,025,637 B1 * | 4/2006 | Lee | 439/638 |
| 7,033,223 B1 * | 4/2006 | Lin | 439/630 |
| 7,044,757 B1 * | 5/2006 | Yen | 439/138 |
| 7,118,421 B2 * | 10/2006 | Kadonaga et al. | 439/638 |
| 2005/0185371 A1 * | 8/2005 | Kuroda et al. | 361/684 |
| 2006/0149855 A1 * | 7/2006 | Fukuda | 710/2 |
| 2007/0004285 A1 * | 1/2007 | Lee | 439/638 |

\* cited by examiner

*Primary Examiner*—Hae Moon Hyeon
*Assistant Examiner*—Harshad C Patel

(57) ABSTRACT

A micro SD adapter structure includes a casing having an insert slot which is a hollow structure in the shape of a mini SD card, a hollow portion at the casing, a plurality of fixing grooves on the casing and corresponding to the hollow portion, a plurality of sunken grooves on the hollow portion, a connecting base proximate to each sunken groove; a transmitting unit having a conducting interface on the hollow portion and the conducting interface is electrically coupled to a plurality of terminals which are installed in the fixing groove of the casing and corresponding to a plurality of sunken grooves; and a latch unit disposed on the connecting base. The micro SD card can be secured into the insert slot to achieve a better electric transmitting effect and swap the micro SD card immediately when the micro SD card is inserted into the insert slot.

6 Claims, 7 Drawing Sheets

MICRO SD ADAPTER STRUCTURE

FIELD OF THE INVENTION

The present invention relates to an improved micro Secure Digital (SD) adapter structure, and more particularly to an adapter structure capable of installing a micro SD card securely into an insert slot of a casing, so that the micro SD card will not be loosened or fallen out easily and a better electric transmission can be achieved. Further, the micro SD card can be swapped immediately when the micro SD card is installed into the casing of the micro SD adapter.

BACKGROUND OF THE INVENTION

Referring to FIGS. 1 and 2 for a prior art micro SD adapter 6, the micro SD adapter 6 comprises an upper casing 61 and a lower casing 62 engaged with each other to form a hollow structure in the shape of a mini SD card; an insert slot 63 disposed at a side of the adapter 6, a hollow portion 64 disposed at an end of the lower casing 62, a transmitting unit 7 disposed on the hollow portion 64, an goldfinger interface 71 installed at the transmitting unit, a fixing portion 72 integrally extended from the goldfinger interface 71 and having a plurality of terminals 73 coupled in a direction towards an opening of the insert slot 63, such that the micro SD card (not shown in the figure) can be inserted into the insert slot 63 at a lateral side of the adapter 6, and each terminal 73 is in contact with the goldfinger at the bottom surface of the micro SD card, so as to achieve an electric transmitting effect.

Although the prior art micro SD adapter 6 can install a micro SD card for achieving the electric transmitting effect, yet the terminals 73 are in a planar form, such that when the terminals 73 are in contact with the goldfingers at the bottom surface of the micro SD card, the terminals 73 becomes less resilient and have no other latching mechanism. As a result, the inserted micro SD card may be loosened or fallen out easily and cannot be inserted securely into the insert slot 63 of the micro SD adapter 6, and the electric transmission may become less efficient.

Since the micro SD card is inserted into a lateral side of the adapter 6, therefore when the adapter 6 is inserted into the card reader, a portion or the whole of the micro SD card in the insert slot 63 is limited to the internal side of a wall of the insert slot of the card reader. Therefore, if a user wants to change the micro SD card while using the micro SD card, the user needs to take the adapter 6 out from the insert slot of the card reader and then remove the micro SD card from the adapter 6 for a swap, and such arrangement causes tremendous inconvenience to users.

SUMMARY OF THE INVENTION

Therefore, it is a primary objective of the present invention to install a micro SD card securely into an insert slot of a casing by a plurality of terminals installed into a sunken groove disposed in the casing and a latch unit, such that the micro SD card will not loosened or fallen out easily to achieve a better electric transmitting effect. The invention also can use an insert slot disposed at a distal edge of the casing to swap the micro SD card when the micro SD card is inserted in the casing of the micro SD card adapter.

To achieve the foregoing objective, an improved micro SD adapter structure of the invention comprises a casing having an insert slot which is a hollow structure in the shape of a mini SD card, a hollow portion disposed at the casing, a plurality of fixing grooves disposed on the casing and corresponding to the hollow portion, a plurality of sunken grooves disposed on the hollow portion, a connecting base disposed proximate to each sunken groove; a transmitting unit having a conducting interface on the hollow portion and the conducting interface is electrically coupled to a plurality of terminals which are installed in the fixing groove of the casing and corresponding to a plurality of sunken grooves; and a latch unit disposed on the connecting base.

DETAILED DESCRIPTION OF THE PREFERRED EMBODIMENTS

Figure 1:
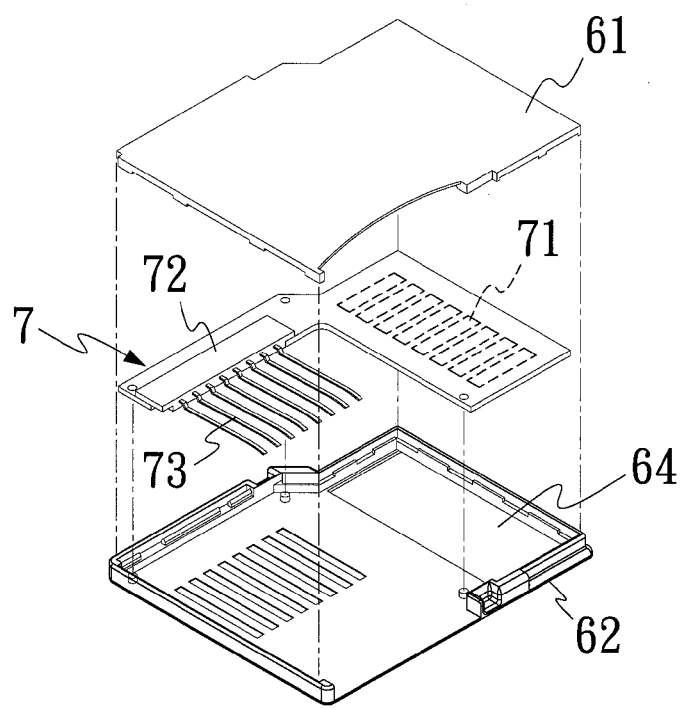
FIG. 1 is an exploded view of a prior art micro SD adapter.
Figure 2:
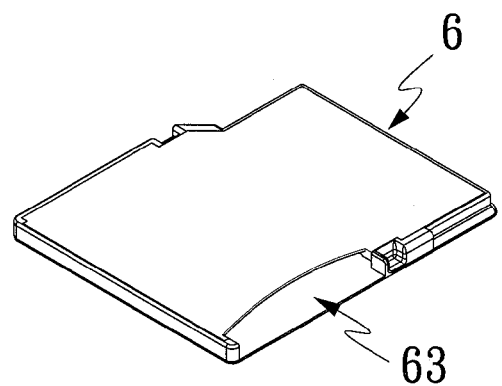
FIG. 2 is a perspective view of a prior art micro SD adapter.
Figure 3:
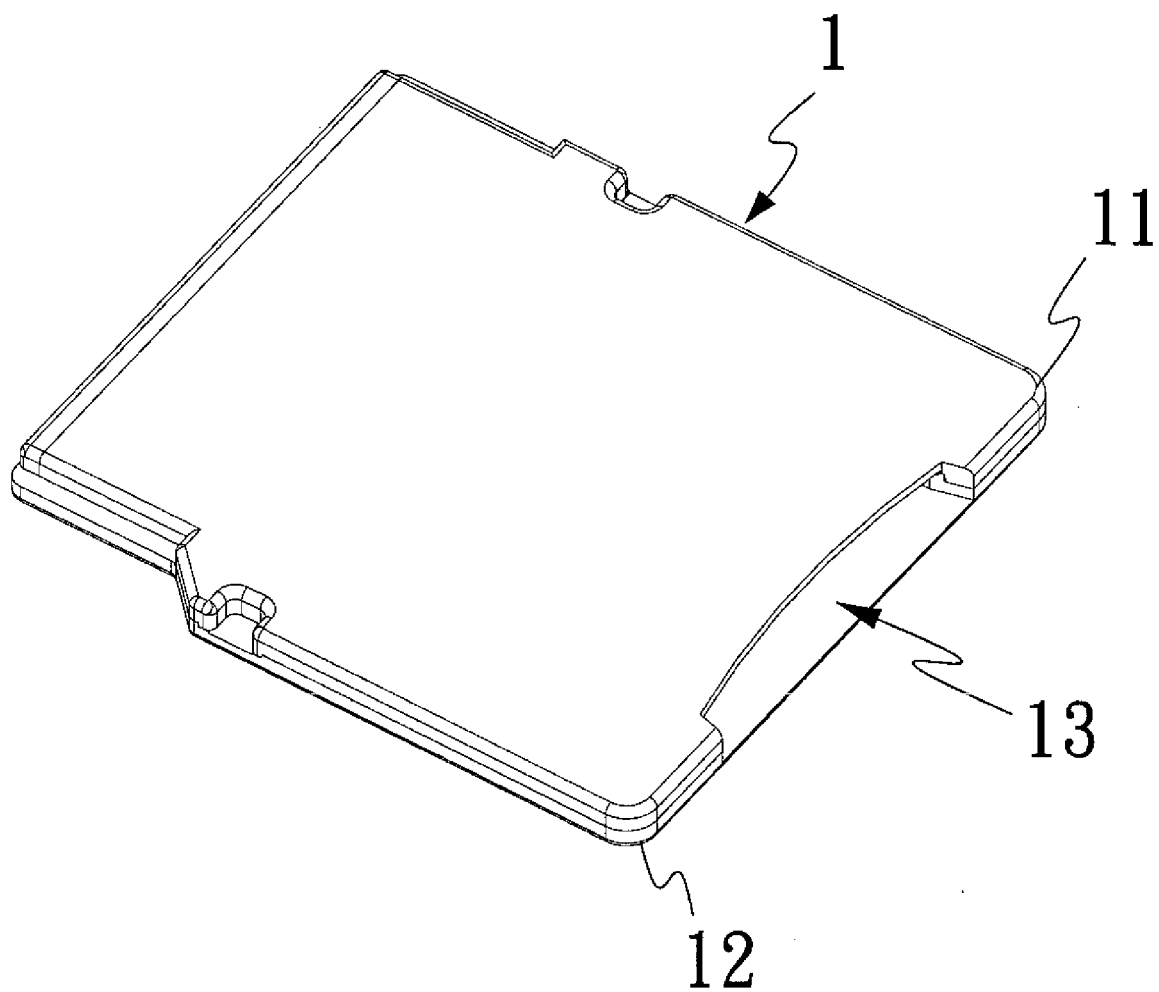
FIG. 3 is a perspective view of a micro SD adapter of the present invention.
Figure 4:
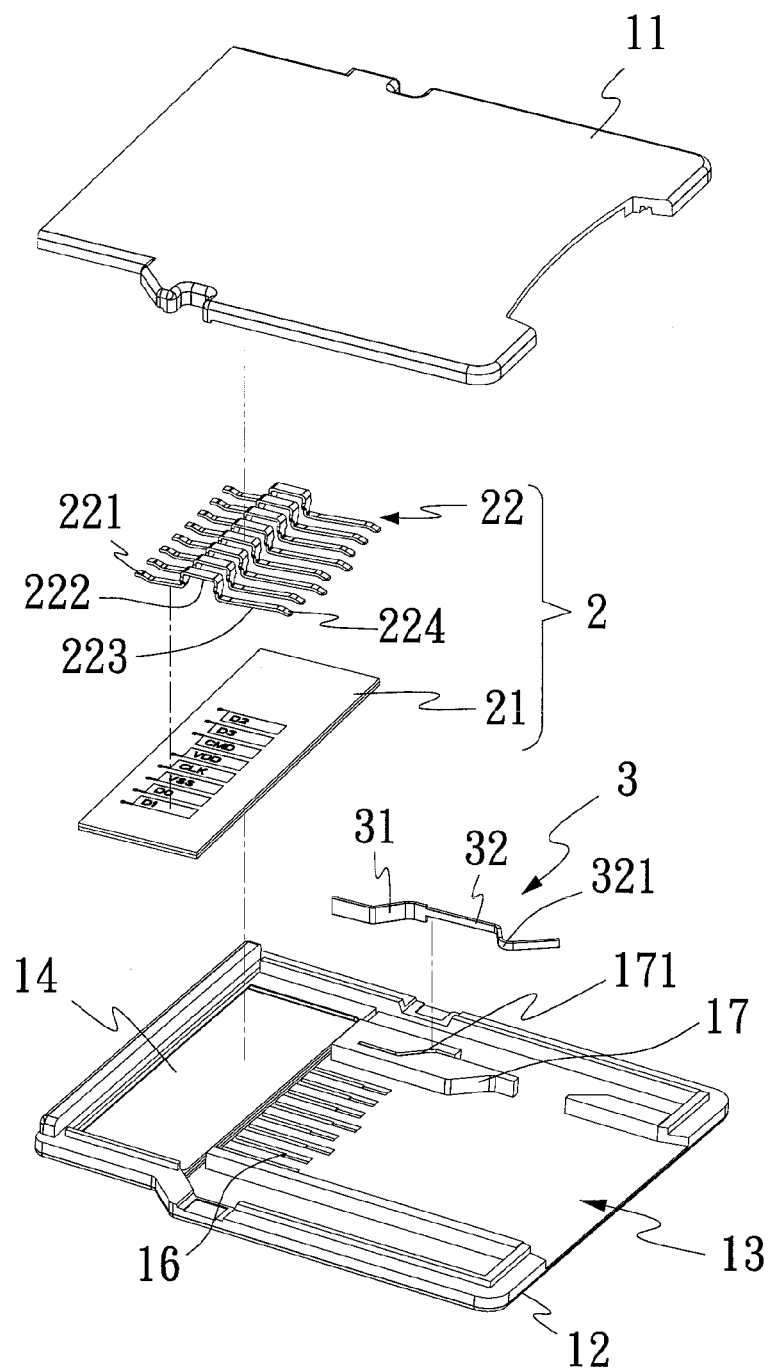
FIG. 4 is an exploded view of a micro SD adapter of the present invention.
Figure 5:
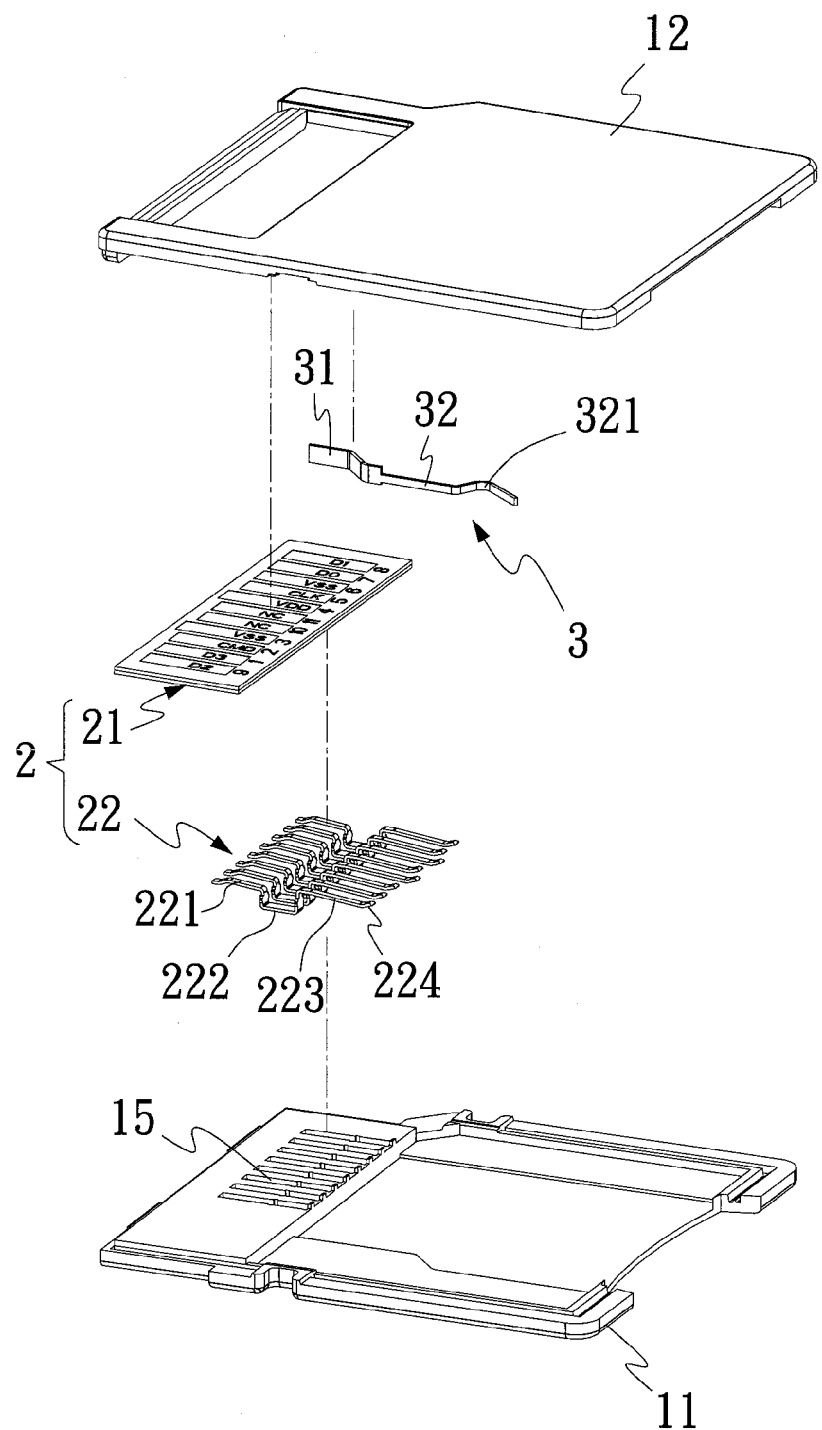
FIG. 5 is another exploded view of a micro SD adapter of the present invention.

Referring to FIGS. 3, 4 and 5 for the perspective view, the exploded view, and the exploded view at another viewing angle of the present invention, an improved micro SD adapter structure of the invention comprises a casing 1, a transmitting unit 2 and a latch unit 3, such that the micro SD adapter structure can install a micro SD card securely into a casing 1, and the micro SD card will not be loosened or fallen out easily, so as to achieve a better electric transmitting effect. The invention also can swap the micro SD card immediately when the micro SD card is inserted into the casing 1 of the micro SD adapter.

The casing 1 comprises an upper casing 11 and a lower casing 12 engaged with each other by ultrasonic waves to form a hollow structure in the shape of a mini SD card, an insert slot 13 disposed at a distal edge of the casing 1 and interconnected with the interior of the casing 1, a hollow portion 14 disposed on a surface of the lower casing 12 of the casing 1, a plurality of fixing grooves 15 disposed on the upper casing 11 of the casing 1 and corresponding to a side of the hollow portion 14, a plurality of sunken grooves 16 disposed on a distal surface of the insert slot 13 at a lateral side of the hollow portion 14, a connecting base 17 disposed proximate to a lateral side of each sunken groove, and an embedding groove 171 disposed on the connecting base 17.

The transmitting unit 2 includes a conducting interface 21 disposed on the hollow portion 14 and being a metal contact plate electrically conductive on both sides and electrically coupled to a plurality of terminals 22, and each terminal 22 is electrically coupled to a contact portion 221 by the conducting interface 21, a fixing portion 222 coupled to an end of the contact portion 221 and installed into the fixing groove 15, and a connecting portion 223 coupled to an end of the fixing portion 222 and corresponding to a plurality of sunken grooves 16. An end of the connecting portion 223 of the terminal 22 includes a slanting surface 224.

The latch unit 3 installed in the embedding groove 171 of the connecting base 17 includes a coupling portion 31 and a bracket 32 coupled to the coupling portion 31 and having a curved portion 321, so that the aforementioned structure constitutes a novel improved micro SD adapter structure.

Figure 6:
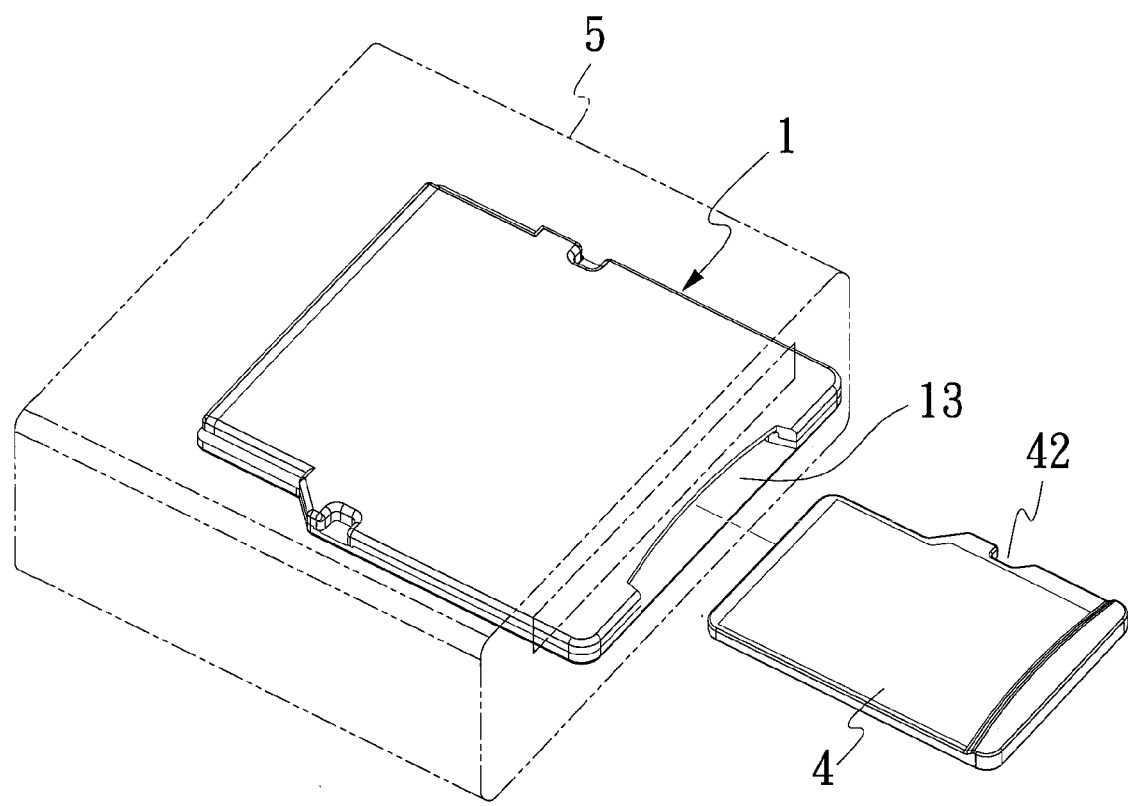
FIG. 6 is a schematic view of inserting a micro SD card into a micro SD adapter according to the present invention.
Figure 7:
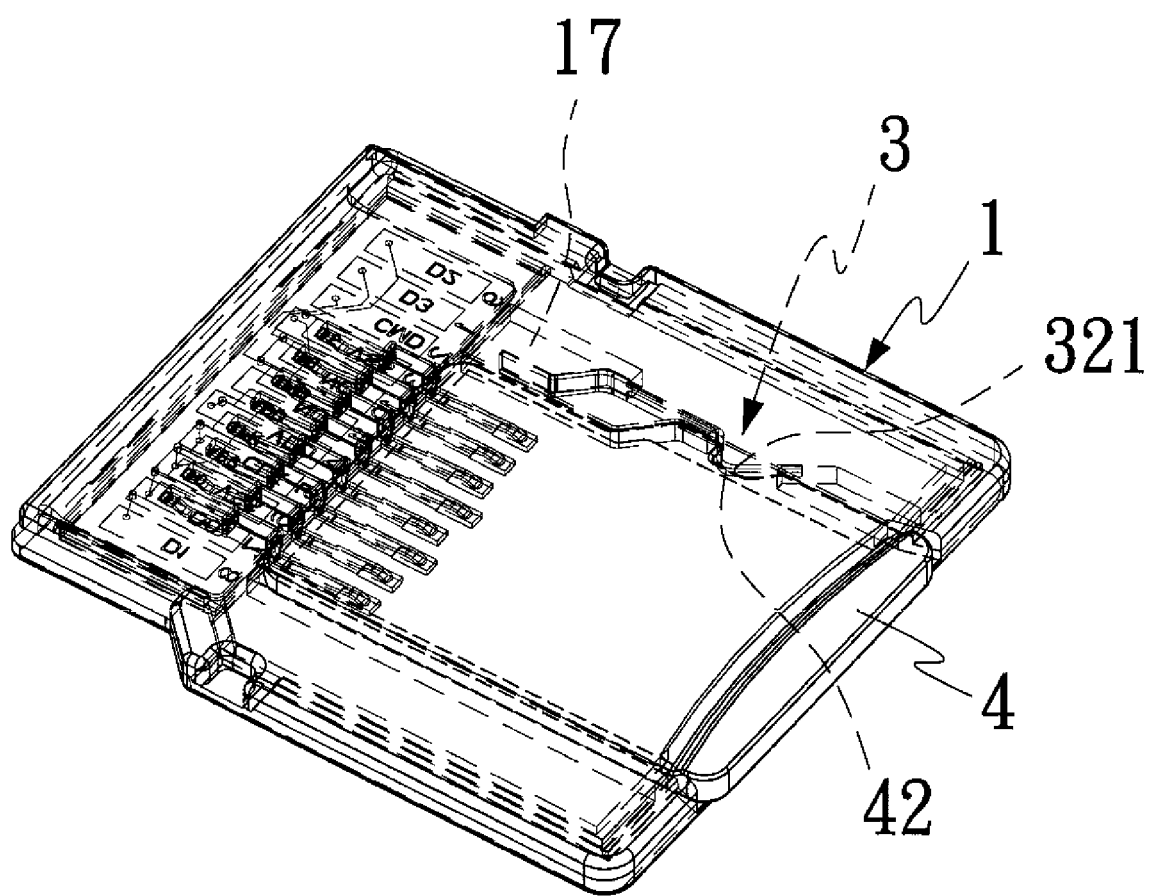
FIG. 7 is a schematic view of a micro SD adapter inserted with a micro SD card according to the present invention.
Figure 8:
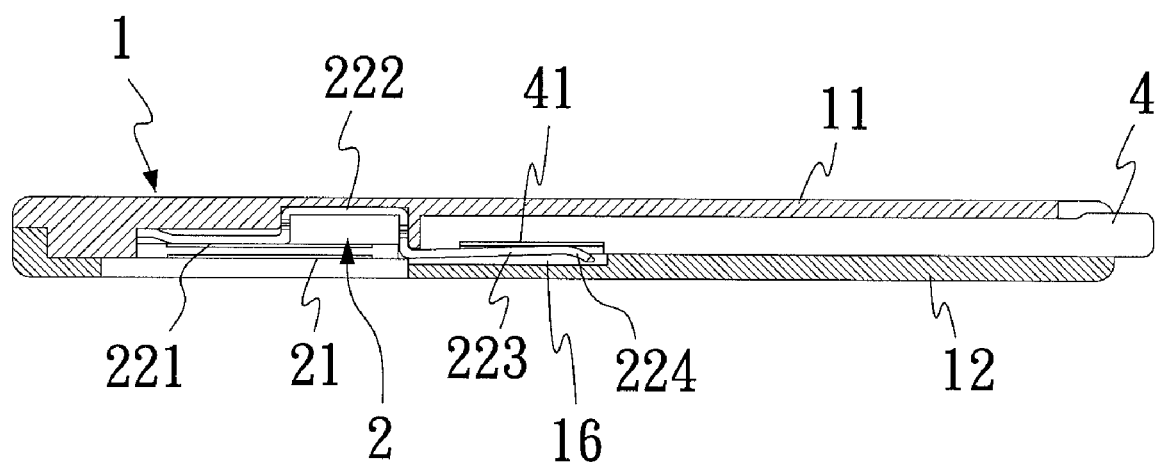
FIG. 8 is a cross-sectional view of a micro SD adapter inserted with a micro SD card according to the present invention.

Referring to FIGS. 6, 7 and 8 for the schematic view of inserting a micro SD card into a micro SD adapter according to the present invention and the schematic view and the cross-sectional view of a micro SD adapter inserted with a micro SD card according to the present invention respectively, the invention inserts the casing 1 into a card reader 5 of an electronic equipment (not shown in the figure) or (connects with the micro SD card 4 first and then the card reader 5), and the micro SD card 4 is inserted into the insert slot 13 of the casing 1, such that a distal edge of the micro SD card 4 is pushed to the slanting surface 224 of the terminal 22 on the transmitting unit 2 to compress the terminals 22 towards the sunken groove 16 of the lower casing 12, and then the resilience of the terminal 22 presses and contacts the goldfinger 41 at the bottom surface of the micro SD card 4. In the meantime, a lateral edge of the micro SD card 4 pushes the bracket 32 of the latch unit 3. After the micro SD card 4 is inserted completely into the insert slot 13. the resilience of the bracket 32 latches the curved portion 321 into a concave opening 42 at a lateral side of the micro SD card 4, such that the micro SD card 4 can be installed securely into the insert slot 13 of the casing 1 and will not loosened or fallen out easily, so as to achieve a better electric transmitting effect. Since the opening of the insert slot 13 is disposed at a rear distal edge of the casing 1, therefore users only need to take the micro SD card 4 directly out from the insert slot 13 of the casing 1 without the need of taking out the card reader 5 from the casing 1 in order to swap the micro SD card 4.

In summation of the description above, the improved micro SD adapter structure of the present invention effectively overcomes the shortcoming of the prior art and securely installs a micro SD card into an insert slot of a casing by a plurality of terminals installed in the sunken groove of the casing and a latch unit, and the micro SD card will not loosened or fallen out so as to achieve a better electric transmitting effect, and herein enhances the performance over the conventional structure and complies with the patent application requirements.

What is claimed is:

1. An improved micro Secure Digital (SD) adapter structure, comprising:

a casing, being a hollow structure in the shape of a mini SD card and including an insert slot disposed at a distal edge of said casing and interconnected with the interior of said casing, a hollow portion disposed on a surface of said casing, a plurality of fixing grooves disposed on said casing and corresponding to said hollow portion, a plurality of sunken grooves disposed on a distal surface of said insert slot at a lateral side of said hollow portion, and a connecting base disposed proximate to a lateral side said each sunken groove;

a transmitting unit, installed at a conducting interface on said hollow portion, and said conducting interface being electrically coupled to a plurality of terminals, and said terminals being disposed in said fixing groove of said casing and corresponding to said plurality of sunken grooves; and a latch unit, installed on said connecting base.

2. The improved micro SD adapter structure of claim 1, wherein said casing comprises an upper casing and a lower casing engaged with each other by ultrasonic waves.

3. The improved micro SD adapter structure of claim 1, wherein said connecting base includes an embedding groove.

4. The improved micro SD adapter structure of claim 1, wherein said each terminal comprises a contact portion electrically coupled to said conducting interface, a fixing portion coupled to an end of said contact portion and disposed at said fixing portion in said fixing groove, and a connecting portion coupled to an end of said fixing portion and corresponding to a plurality of sunken grooves.

5. The improved micro SD adapter structure of claim 4, wherein said connecting portion of said terminal includes a slanting surface disposed at an end of said connecting portion.

6. The improved micro SD adapter structure of claim 1, wherein said latch unit comprises a coupling portion and a bracket coupled with said coupling portion and having a curved portion.

\* \* \* \* \*